INVENTOR
REINOLD HAGEN
BY
his ATTORNEY

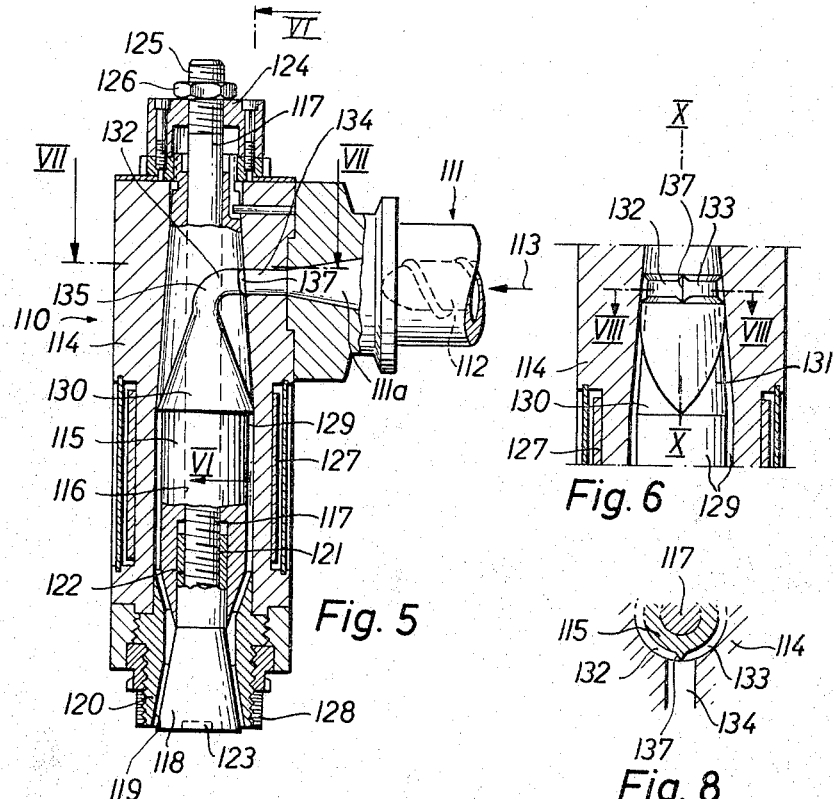
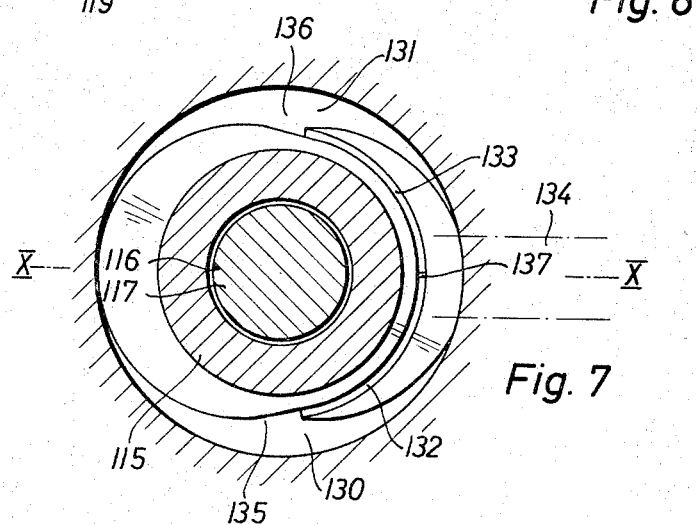

INVENTOR
REINOLD HAGEN
BY Michael S. Striker
his ATTORNEY

United States Patent Office 3,345,690
Patented Oct. 10, 1967

3,345,690
APPARATUS FOR EXTRUDING THERMO-
PLASTIC TUBES
Reinold Hagen, Hangelar uber Siegburg,
Rhineland, Germany
Filed Oct. 21, 1965, Ser. No. 499,738
Claims priority, application Germany, Feb. 14, 1963,
K 48,942; Oct. 21, 1964, K 54,311
5 Claims. (Cl. 18—14)

ABSTRACT OF THE DISCLOSURE

A blow molding apparatus wherein the cylinder of the extrusion machine receives plasticized material through a lateral inlet and accommodates a mandrel which defines therewith an annular chamber and a pair of mirror symmetrical recesses which diverge circumferentially of the mandrel toward the chamber. The recesses receive plasticized material from the inlet and convey such material in the form of two streams which expand laterally and merge in the chamber to form a single annular stream which is extruded through the orifice of a die to form a tubular parison.

---

This is a continuation-in-part of my copending application Ser. No. 341,688, filed Jan. 31, 1964 and now abandoned.

The present invention relates to apparatus for extruding thermoplastic materials. More particularly, the invention relates to apparatus for extruding tubular parisons. Still more particularly, the invention relates to apparatus for extruding tubular parisons by resorting to one or more plasticizers which feed plasticized material in directions other than the direction in which the parison issues from the extrusion orifice.

In conventional extruding apparatus wherein plasticized material enters in a first direction and issues in a second direction, normally at an angle of 90 degrees with reference to the first direction, such deflection of plasticized material often results in the production of inferior articles. The quality of the ultimate product is more satisfactory if the pressure prevailing in each zone of the extrusion orifice is the same. Otherwise, a material which, upon extrusion, tends to swell to a degree which is a function of the pressure prevailing in the orifice, will have portions of different wall thicknesses.

An object of the instant invention is to provide a novel apparatus which may be utilized for practicing the above outlined method and which is capable of deflecting a stream of plasticized material from one or more inlets into an annular chamber whose axis is normal or substantially normal to the direction of material flow through the inlets whereby the deflection takes place in such a way that each zone of plasticized material which fills the chamber is invariably subjected to the same pressure.

A concomitant object of the invention is to provide an apparatus of the just described type wherein the annular chamber may receive material from a plurality of plasticizers and wherein accurately measured quantities of plastic material may be expelled or extruded at desired intervals so that the resulting parisons may enter a blow mold or another processing machine.

Still another object of my invention is to provide an extruding apparatus wherein each portion or zone of plasticized material remains for the same or nearly the same period of time, wherein each such zone or portion covers the same or nearly the same distance while the material travels from the outlet of the plasticizer to the discharge end of the extrusion orifice, and wherein all zones of the conveyed material are subjected to the same heating action.

A further object of the present invention is to provide a novel crosshead which may be used in an apparatus of the above outlined characteristics and to construct the crosshead in such a way that the path defined thereby for plasticized material is entirely free of dead corners or similar areas which would tend to accumulate plastic material.

Still another object of the invention is to provide a novel ejector for use in an apparatus of the above outlined characteristics and to construct the ejector in such a way that it can invariably eject identical or predetermined quantities of plasticized material, that the ejection or extrusion of plasticized material takes place automatically and at desired intervals, and that the ejector may operate independently of the prime mover which causes the plasticized material to flow toward the extrusion orifice.

A further object of the invention is to provide an extruding apparatus which is particularly suited for the production of tubular parisons and wherein equalization of pressures in all zones of the extrusion orifice is not caused by undue lengthening of the annular chamber.

Another object of the invention is to provide an apparatus for the production of tubular parisons which consist of thermoplastic material and to construct the apparatus in such a way that it may be rapidly and conveniently converted for the production of thin-walled, thick-walled, shorter and/or longer tubular parisons.

An additional object of the invention is to provide an apparatus which can form part of an automatic production line for plastic bottles or similar blow-molded or otherwise expanded or shaped hollow plastic articles.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

FIG. 5 illustrates a portion of a modified apparatus with the crosshead shown in axial section;

FIG. 6 is a fragmentary vertical section substantially as seen in the direction of arrows from the line VI—VI of FIG. 5;

FIG. 7 is an enlarged horizontal section substantially as seen in the direction of arrows from the line VII—VII of FIG. 5;

FIG. 8 is a section substantially as seen in the direction of arrows from the line VIII—VIII of FIG. 6;

Figure 1:
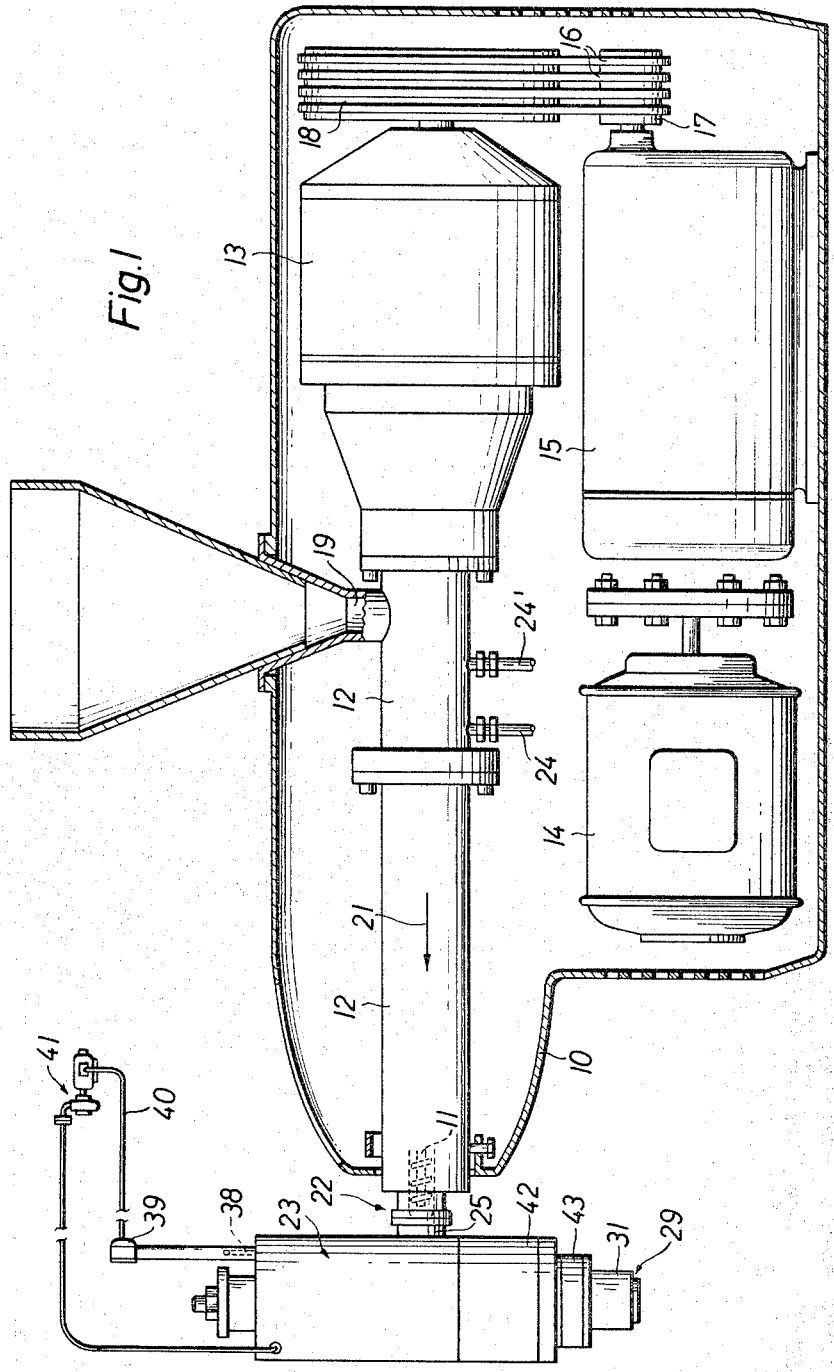
FIG. 1 is a side elevational view of an extruding apparatus which embodies one form of my invention, the casing of the plasticizer being shown in longitudinal vertical section.

Referring to FIG. 1, there is shown a casing which accommodates a plasticizer including a horizontal screw conveyor 11 surrounded by a jacket 12 which is joined to a bearing mechanism 13 for the screw conveyor 11. A motor 14 drives a transmission 15 which, in turn, drives four V-shaped pulley belts 16 mounted on sheaves 17 and 18.

The jacket 12 is provided with a material admitting opening 19 which communicates with a funnel. The thermoplastic material is introduced into the funnel in the form of granules. Such granules are plasticized while being conveyed in the direction of the arrow 21 within the jacket 12 for the screw conveyor 11 and form a first stream which leaves the plasticizer at the discharge end or outlet 22 to enter an extruder crosshead 23. The jacket 12 is connected to pipes 24 and 24' for introducing and discharging a cooling and/or heating fluid.

Figure 2:
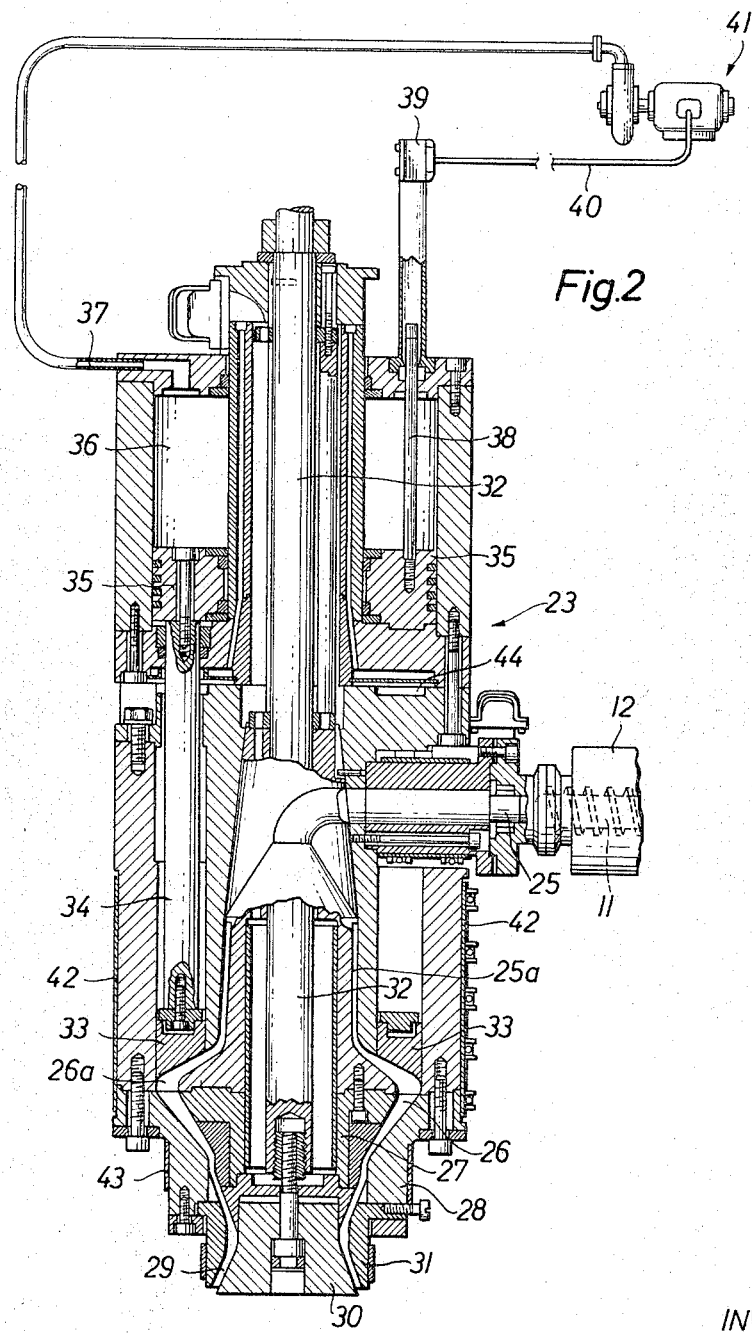
FIG. 2 is an enlarged axial section through the crosshead of the apparatus which is shown in FIG. 1.

The crosshead 23 is shown in detail in FIG. 2. Its radially extending inlet 25 communicates with the jacket 12 of the screw conveyor 11 so that the first stream coming from the conveyor passes into an annular chamber 26. This chamber 26 is defined by a vertical spreader or mandrel 27 and by a tubular inner shell 28 forming part of the tubular housing of the crosshead 23. The annular chamber 26 opens into the annular extrusion orifice 29 of a die which is located at the lower end of the crosshead 23 and is composed of a central core 30 and an outer wall or matrix 31. The core 30 is movable in a vertical direction by means of an adjusting rod 32 in order to open, to close and/or to vary the cross-sectional area of the orifice 29 and thus to determine the wall thickness of the finally extruded material.

The chamber 26 extends vertically upwardly from the orifice 29 to an annular compartment or magazine 26a. An annular plunger 33 is reciprocable in the compartment 26a and is joined by a connecting bolt 34 to a second plunger 35 which is reciprocable in a cylinder 36. Hydraulic pressure fluid is supplied through a pipe 37. The plunger 35 is connected to a control rod or trip 38 which extends to a limit switch 39. When the plunger 35 is moved to its upper end position, the switch 39 is actuated and through line 40 activates a motor 41 which operates a pump. Thus, pressure is produced in the pipe 37 for forcing the plunger 35 downwardly. The crosshead 23 is also provided with heat exchanger elements 42 and 43. The parts 33–36 constitute an ejector and the parts 37–41 constitute a control unit which causes the plunger 33 to perform a working stroke and to expel a predetermined quantity of material into and through the orifice 29 when the compartment 26a is filled to a predetermined extent.

In operation, material flowing from the screw conveyor 11 into the inlet 25 forms a first stream which flows around the mandrel 27 and is subdivided into a pair of secondary streams in a manner to be fully described in connection with FIGS. 5–8. The two secondary streams merge in an annular upper portion 25a of the chamber 26 with a change in direction from the horizontal to the vertical and the resulting single annular stream then flows into the lower part of the annular chamber 26 and/or into the compartment 26a. Starting from the position of the parts as shown in FIG. 2, the thermoplastic material, after filling the chamber 26, then forces the plunger 33 upwardly so that the material will flow into and fills the compartment 26a. This is because the resistance the material must overcome while being forced through the orifice 29 is so great that, as long as the chamber 26a is not entirely filled, and since the plunger 33 does not offer any resistance to displacement except natural friction, the synthetic material will flow into the compartment 26a without any material being forced out through the orifice 29. While the compartment 26a is being filled, the plunger 35 rises in the cylinder 36 until the rod 38 trips the limit switch 39. Then hydraulic pressure is applied to cylinder 36 to force the plungers 35 and 33 downwardly until they reach the positions shown in FIG. 2. This forces out a tubular segment or parison 45 (see FIG. 3) which has been pre-shaped in the compartment 26a and has been expelled through the orifice 29. In other words, a portion of the pre-shaped body coming from the compartment 26a remains in the chamber 26 between the inlet 25 and the orifice 29 after the extrusion process is finished, and this material portion is not forced out until the occurrence of the next extrusion cycle.

Cooling tubes 44 provide a cooling zone above the compartment 26a to prevent heat coming from the thermoplastic material from rising upwardly. These cooling tubes are mounted in such a way that they also cool the annular plunger 33 when the latter assumes its upper end position.

As heretofore stated, my method according to which a pre-shaped segment of the material to be extruded is first formed in the crosshead 23 results in a considerable improvement in the quality of the finally extruded material. The final product is more homogeneous, free from stresses, and has a good appearance because of the absence of flow lines.

These improvements are carried over into the further processing of the extruded product. For example, the material can be further processed in a blow mold in the manner as disclosed in U.S. Patents Nos. 2,787,017, 2,918,698, 2,975,473, and 3,009,196.

Figure 3:
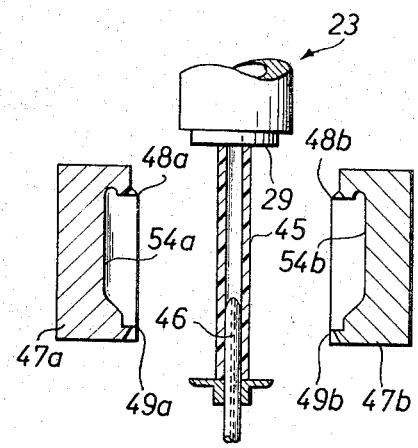
FIG. 3 is a section through a portion of the crosshead with a freshly extruded tubular parison extending into an open blow mold which is illustrated in vertical section.
Figure 3A:
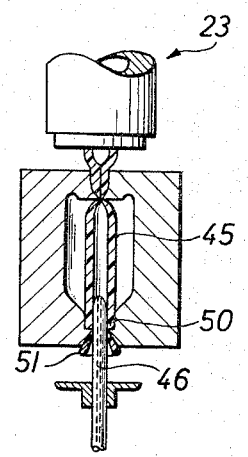
FIG. 3a shows the structure of FIG. 3 with the blow mold in closed position.
Figure 3B:
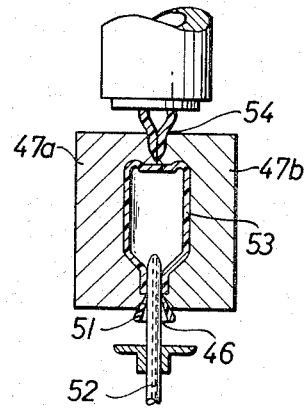
FIG. 3b illustrates the blow mold subsequent to admission of compressed gas into the parison.

As a further example, and as shown in FIG. 3, the tube segment or parison 45 which is extruded from the crosshead 23 by means of the annular piston 33 is positioned with its lower end open over the end of a compressed air nozzle 46. Then the two halves 47a and 47b of a blow mold are closed together to pinch and cut the parison 45 by means of cutting edges 48a, 48b and 49b, as shown in FIG. 3a. By so doing, the upper end of the parison 45 is clamped so that it is pinched off and welded together. The cutting edges 49a and 49b are shaped to conform with the lower end 50 of the parison 45 and the air nozzle 46 so that the projecting end 51 of the parison is also cut off. Compressed fluid, such as compressed air, passing through the bore 52 of the nozzle 46 enters the parison 45 and converts this parison into a bottle 53 having the configuration of the mold surfaces 54a and 54b. As soon as the bottle 53 has sufficiently cooled, the mold is opened and the finished product removed. The remaining portions 51 and 54 which are perhaps still connected with the bottle 53 by very thin strips or webs can be torn off without difficulty and without the use of tools.

Figure 4:
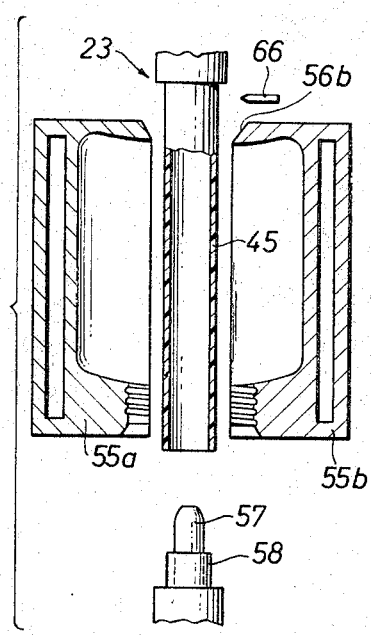
FIG. 4 illustrates a portion of the crosshead and a modified blow mold which is shown in vertical section and with its halves moved apart so that the mold cavity may receive a freshly extruded tubular parison.
Figure 4A:
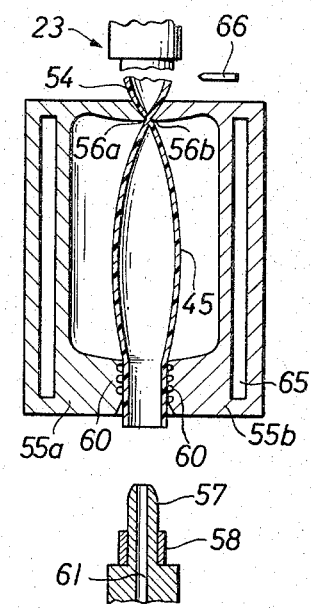
FIG. 4a illustrates the structure of FIG. 4 with the mold in closed position.

In the example of FIG. 4, the extruded parison 45 is positioned between the two halves 55a and 55b of a blow mold. After the parison has reached a length determined by the end of the stroke of the annular plunger 33, the mold is closed as shown in FIG. 4a. A tubular portion 54 is severed by the cutting edges 56a and 56b and the top of the parison 45 is welded together.

Figure 4B:
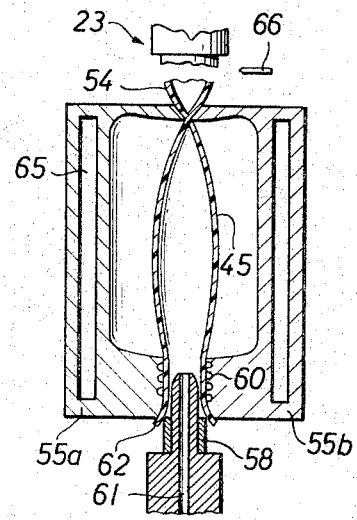
FIG. 4b illustrates the structure of FIG. 4a with the gas-admitting nozzle of the blow mold in operative position.
Figure 4C:
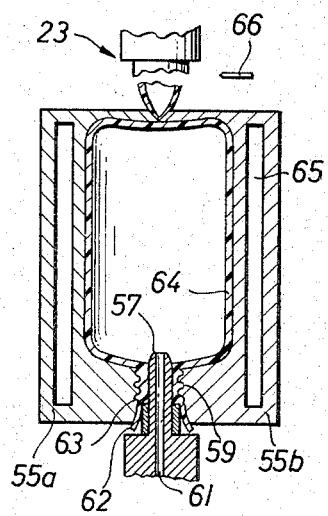
FIG. 4c illustrates the structure of FIG. 4b with the parison in fully expanded condition.

The main difference between the process of FIG. 4 and the process of FIG. 3 is in that the air nozzle 57 is still outside the mold at the time the mold halves 55a and 55b are closed, as shown in FIG. 4a. An air nozzle 57 is provided with a collar 58 in the form of a piston whose outer diameter corresponds approximately to the inner diameter of a threaded opening 60 in the mold which defines the bottle neck 59. The nozzle 57 is then forced upwardly into the threaded opening, as shown in FIGS. 4b and 4c, so that the threaded bottle neck is formed and air is blown through the nozzle bore 61 to expand the parison and to convert it into a bottle. The excess material 62 at the lower end of the parison 45 is forced aside. The collar 58 determines the length of the threaded bottle neck.

After the blown parison has cooled, the mold is opened and the bottle 64 is removed. A cooling channel 65 for the passage of a cooling fluid is provided in each mold half in order to accelerate the cooling of the bottle.

A knife 66 is positioned between the crosshead 23 and the blow mold for cutting off the residual pinched tubular segment or portion 54 so that the lower end of the parison 45 will be open.

When using the apparatus of FIG. 2, each of the processes of FIGS. 3 and 4 can be used to inflate the parisons and make bottles of substantially better quality than obtained heretofore.

Furthermore, another advantage of this invention lies in that the horizontal screw conveyor 11 can be operated continuously without the necessity of removing the blow mold from beneath the extrusion orifice 29. In my improved apparatus, the mold continuously remains beneath the orifice 29. After a parison 45 has been extruded, and at that point of time represented by FIGS. 3 and 4, no material can leave the orifice 29 since the blow mold is in the way. Heretofore, when this was the case, it was necessary to stop the screw conveyor 11 until a bottle had been blown and then removed from the blow mold so that the mold was ready to receive a fresh parison. Such is not necessary in my apparatus because, during the time required for blowing a parison in the mold, the following material entering the crosshead 23 from the screw conveyor 11 is being fed into the compartment 26a.

When a tubular parison is formed in accordance with the heretofore known methods and by utilizing conventional apparatus which deflect a single stream of plasticized material while the material flows from the inlet to the extrusion orifice of a crosshead, the definite orientation of macromolecular chains caused by the change in the direction of material flow in the crosshead cannot be eliminated or smoothed out before the material is extruded through the orifice. Such molecular orientation is caused both by the change in the direction of flow as well as by changes in pressure. Consequently, the molecular orientation causes stresses which lead to fissures or other undesirable characteristics of the ultimate product. It was further noted that the ultimate product which is obtained by resorting to conventional methods is often streaky and that such streakiness is due to the fact that the annular stream is formed shortly before the material issues from the orifice, i.e., that the plasticized material does not have enough time to correct or to eliminate such irregularities. The streaks affect the appearance and sales appeal of the ultimate product. In fact, it can happen that the final product is so weak along the joints between the streams which are merged into a single annular stream just before the latter issues from the extrusion orifice that a bottle or another hollow article which is obtained by further shaping of the extruded tubular product is likely to break or to leak. The same drawbacks are observable when the aforedescribed conventional methods and apparatus are utilized for the production of plastic sheets. The problem of evenly distributing the pressures in all zones of the plasticized material prior to actual extrusion is just as acute in the production of sheets as in the production of tubes.

In accordance with the method which can be carried out by resorting to the apparatus of FIGS. 1 and 2, the material is caused to change the direction of its flow from horizontal to vertical and is thereupon extruded without any further change in direction. The change in direction does not take place immediately before the annular stream issues from the extrusion orifice, i.e., the deflection of two secondary streams which flow from the inlet 25 to the annular chamber 26 takes place in a zone which is rather closely adjacent to the inlet. Therefore, any flow lines which might be observable in the material during deflection will disappear before the material issues from the orifice 29. It was found that the material issuing from the orifice 29 is homogenized and that all flow lines disappear before the material reaches the discharge end of the orifice 29. The temperature of extruded material, too, is the same in each zone thereof. This is due to the fact that the ratio between the surface area and the volume of material which is conveyed through the crosshead 23 is relatively large. This means that, with regard to the thermoplastic material itself, its heat conductivity is rather poor and only short paths are present for the passage of heat, i.e., such paths whose length corresponds to the wall thickness of the parison 45.

The crosshead 110 of the apparatus which is shown in FIGS. 5 to 8 is connected with the discharge end or outlet 111a of a plasticizer 111 including a screw conveyor 112 which is arranged to plasticize the material in the presence of heat and to feed the thus plasticized material in the direction indicated by an arrow 113. The crosshead 110 comprises a tubular housing 114 which accommodates an axially extending annular mandrel 115. The mandrel is formed with an axial bore 116 which receives a reciprocable adjusting rod 117. The lower end portion 121 of the rod 117 is provided with external threads and carries a core 118 forming part of an annular extrusion die which defines an annular extrusion orifice 119. The second part of the extrusion die includes an annular outer wall or matrix 120. The connection between the core 118 and the rod 117 includes an internally threaded sleeve or nut 122 at the upper end of the core which meshes with the externally threaded portion 121.

The upper end portion 125 of the rod 117 is also provided with external threads to take a stop nut 126 which bears against the upper end face of a traverse 124. If the nut 126 is loosened and the rod 117 is rotated in a clockwise or counterclockwise direction, the core 118 will move up or down to thereby change the cross-sectional area of the orifice 119. Such changes in the cross-sectional area of the orifice 119 are due to the fact that the orifice tapers downwardly and outwardly, i.e., that the core 118 resembles the frustum of a cone. The cross-sectional area of the orifice 119 will be changed when the personnel in charge wishes to convert the apparatus for the production of tubular parisons having a different wall thickness. The core 118 does not rotate with the rod 117 because friction prevailing between the peripheral surface of the core and the plasticized material exceeds the friction between the threads of the sleeve 122 and the end portion 121. Alternatively, the lower end face of the core 118 may be formed with a recess 123 which can receive the working end of a screwdriver or another suitable tool to change the angular position of the core with reference to the rod 117 and to thereby change the cross-sectional area of the orifice 119.

The median portion of the crosshead 110 carries a concentric heat exchanger element 127. A second heat exchanger element 128 surrounds the peripheral surface of the matrix 120 to heat uniformly all zones of the orifice 119. The mandrel 115 and the housing 114 define between themselves an annular chamber 129 which discharges into the orifice 119. The chamber 129 is concentrically surrounded by the heating element 127, and its upper or intake end communicates with two recesses 130, 131 which are located diametrically opposite each other. These recesses are provided in the convex peripheral surface of the mandrel 115 and, as best shown in FIG. 7, each thereof extends circumferentially of the mandrel along an arc whose length is greatest in the zone nearest to the intake end of the chamber 129. At its lowermost end, each of the recesses 130, 131 extends along an arc of 180 degrees and merges into the upper end of the chamber 129.

The outer sides of the recesses 130, 131 are bounded by the concave internal surface of the housing 114, and these recesses respectively communicate with channels or passages 132, 133 which, in turn, communicate with the inlet 134 admits a first stream of plasticized material which issues from the outlet 111a of the plasticizer 111. The upper portions of the channels 132, 133 extend first in the circumferential direction of the mandrel 115 and thereupon extend downwardly beginning in zones which are angularly spaced by 90 degrees from the axis of the inlet 134. The zones of deflection of the channels 132, 134 are respectively indicated at 135 and 136, and such deflection takes place through angles of 90 degrees. In other words, each channel resembles a substantially L-shaped bend. The lower ends of the channels 132, 133 respectively merge into the upper end portions of the recesses 130, 131. As clearly shown in FIG. 5 (for the recess 130), the upper zones of the recesses 130, 131 are rather narrow, and these recesses thereupon diverge in the circumferential direction of the mandrel 115 so that each thereof extends along an arc of 180 degrees in that zone which merges into the upper part of the chamber 129. The width of the upper zones of the recesses 130, 131 (as seen in the circumferential direction of the mandrel 115) approximates the width of the channels 132, 133. In other words, the stream of plasticized material which is forced into the inlet 134 first flows through such portions of the channels 132, 133 which extend circumferentially of the mandrel 115, thereupon downwardly subsequent to deflection in the zones 135, 136, then into the narrow upper zones of the recesses 130, 131, through the widening portions of the recesses 130, 131, through the chamber 129, and finally through the orifice 119. On entering the inlet 134, the plasticized material forms a single coherent stream. This stream is then subdivided into two smaller secondary streams which respectively flow into the channels 132, 133. In order to facilitate such separation of the first stream into a pair of secondary streams, the crosshead 110 is preferably provided with a mechanical separator in the form of a blade 137 which is provided on the mandrel 115 and is positioned opposite the inlet 134, see particularly FIG. 8. The surfaces of the blade 137 may be suitably inclined so as to direct the secondary streams into the respective channels. Such secondary streams the travel in the circumferential direction of the mandrel 115 to reach the zones 135, 136 and to be deflected through 90 degrees so as to advance toward the narrower upper ends of the recesses 130, 131. The deflection zones 135, 136 are located diametrically opposite each other. Once the two secondary streams reach the upper zone of the chamber 129, they merge to form a single annular stream which is thereupon expelled into and through the orifice 119 to form a tubular section or parison. The channels 132, 133 and the recesses 130, 131 are mirror symmetrical with reference to a plane X—X which includes the axis of the mandrel 115 and halves the inlet 134. The blade 137 is located in the plane X—X.

It will be seen that the stream of plasticized material which is discharged from the plasticizer 111 does not immediately enter the chamber 129. Such material is subdivided in a first step to form two separate secondary streams which are deflected in the zones 135, 136, namely, in zones which are equidistant from the inlet 134 and are located diametrically opposite each other (with reference to the axis of the mandrel 115). On leaving the zones 135, 136, the two streams expand in the circumferential direction of the mandrel 115 so that each thereof ultimately forms a concavo-convex semicylindrical body which extends through an angle of 180 degrees. Such method of introducing the plasticized mass into the chamber 129 insures that pressure prevailing in each part of the cross-sectional area of the chamber 129 is the same.

In certain heretofore known extruder crossheads wherein the plasticized material is deflected through an angle of 90 degrees, the pressure at the side which is nearer to the plasticizer exceeds the pressure at the other side. In the absence of any means for subdividing the first stream into a pair of mirror symmetrical streams which thereupon merge in the chamber 129, pressure prevailing in the right-hand portion of the chamber 129 and orifice 119 as viewed in FIGS. 5 and 7 would exceed the pressure in the left-hand portion. This would bring about a number of serious drawbacks. For example, many thermoplastic materials tend to swell and to increase their volume as soon as they leave the extrusion orifice, i.e., as soon as the compressive stresses upon such materials are reduced. The extent of swelling depends on the magnitude of compressive stresses to which the material was subjected during extrusion. Thus, and if all zones of the material are not subjected to identical stresses, swelling in one or more parts of a freshly extruded parison will exceed the swelling in the other part or parts thereof. Consequently, the ultimate product would have portions of different wall thickness which is often undesirable, especially when the ultimate product is to constitute a bottle or the like.

The pressure differential in the crosshead of conventional extruding apparatus is greatest in the region where the material enters the interior of the crosshead and is less in the extrusion die proper. With reference to FIG. 5, this would means that the pressure differential between the upper left-hand and upper right-hand portions of the chamber 129 would exceed the pressure differential between the lower left-hand and right-hand zones of the orifice 119. This is due to the fact that a certain pressure equalization takes place while the material flows through the chamber 129 and orifice 119. With this in mind, one could say that all zones of the material which fills the orifice 119 will be subjected to the same pressure if the path in which the material flows toward the orifice 119 is sufficiently long. However, and were the construction of the crosshead 110 based on such principle, this would mean that the chamber 129 would be extremely long which is undesirable because of greatly increased cost and also because a very long and bulky crosshead is difficult to handle. The improved crosshead 110 is constructed and configured in such a way that the equalization of pressures which takes place when the path defined by the chamber 129 is sufficiently long need not to be considered at all, i.e., the configuration of the path in which the material flows into the orifice 119 is selected in such a way that, in all zones of the orifice 119, the material is subjected to the same pressure despite the fact that the chamber 129 may be very short, namely, shorter than is necessary to bring about a desired equalization of pressure solely because equalization will take place if the material flows along a path of considerable length. It can be said that the path in which the material flows from the inlet 134 to the orifice 119 is configurated in such a way that it does not permit the generation of pressure differentials so that the length of the chamber 129 is of no consequence, insofar as such equalization of pressures is concerned.

The pressure differential in different zones of the annular chamber and in different zones of the extrusion orifice in a conventional apparatus will increase with increasing diameter of the parison, i.e., such pressure differential increases with increasing diameter of the chamber and orifice. This problem, too, does not arise in the apparatus of my invention because the equalization of pressures is independent of the dimensions of the chamber 129 and orifice 119, this being due to the fact that the first or main stream of plasticized material is subdivided and thereupon reunited in a manner as described above. In other words, the provision of recesses 130, 131 and channels 132, 133 is of advantage in all such types of crossheads wherein the parison issues in a direction substantially at right angles to the direction in which the material enters the crosshead, regardless of the diameter of the chamber and extrusion orifice.

Another very important advantage of the improved crosshead resides in that the path in which the material flows to the extrusion orifice 119 does not have any dead corners in which the material would tend to accumulate. This is of particular importance when the crosshead is to be converted for extrusion of parisons which consist of a different material or a differently colored material. For example, if a yellow plastic material is to be extruded after a black plastic material, the interior of the crosshead must be absolutely clean to avoid streaking which would affect the appearance of parisons. The aforedescribed path for plastic material is configured in such a way that all traces of plasticized material are invariably expelled before the next batch of plasticized material can enter the channels 132, 133 to flow into and through the recesses 130, 131, chamber 129 and orifice 119.

Figure 9:
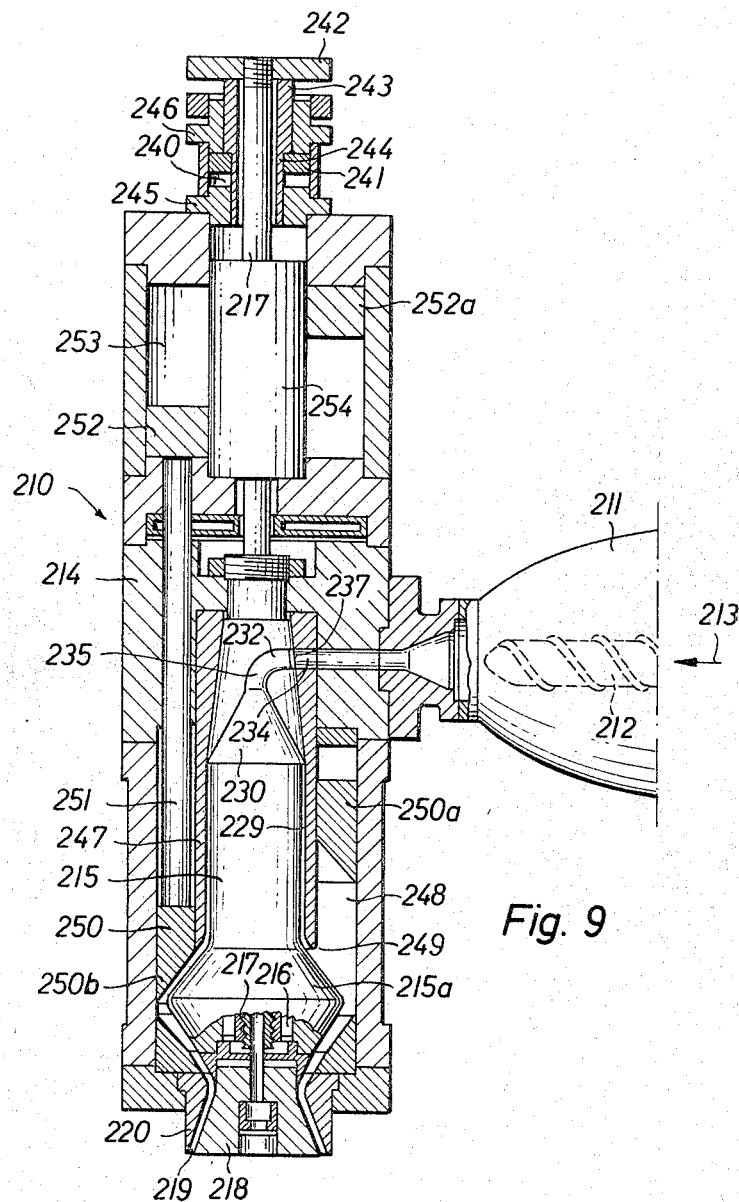
FIG. 9 illustrates a portion of a third apparatus with the crosshead shown in axial section.

In the apparatus of FIG. 9, the crosshead 210 is connected with a plasticizer 211 which accomodates a screw 212 serving to feed a stream of plasticized material in the direction indicated by an arrow 213. Such material enters the crosshead 210 through a radial inlet 234 which is provided in the tubular housing 214. The latter accommodates an annular mandrel 215 having an axial bore 216 for an adjusting rod 217. The lower end portion of the rod 217 carries the core 218 of an extrusion die, and the die further includes an annular matrix 220 which defines with the core 218 a downwardly diverging annular extrusion orifice 219.

The rod 217 may be adjusted by means of a cylinder 240 which accommodates a reciprocable piston 241. The connection between the upper end portion of the rod 217 and the piston 241 comprises a nut 242 which is provided with a cylindrical sleeve 243 having an annular shoulder which bears against the upper side of the piston 241. The smaller-diameter lower end portion 244 of the sleeve 243 extends through the piston 241 and its external surface constitutes the internal surface for the chamber of the cylinder 240. The piston 241 may be secured to the cylindrical portion 244 so that the rod 217 is compelled to share all axial movements of this piston with reference to the cylinder 240. The axial ends of the cylinder 240 are closed by annular sealing members 245, 246. By rotating the nut 242 with reference to the rod 217, the operator can select the initial axial position of the core 218.

The mandrel 215 is surrounded by a cylindrical inner sleeve or jacket 247. The lower portion of this sleeve defines with the lower portion of the mandrel an annular chamber 229. The upper portion of the sleeve 247 tapers conically inwardly to form a seat for the adjacent portion of the mandrel 215, such portion being preferably conical so as to fit snugly into the seat. The same holds true for the mandrel 115 of FIG. 5 whose upper portion is conical to fit into a complementary conical seat of the housing 114. Such configuration of the mandrel facilitates proper assembly and allows for rapid dismantling of the crosshead.

In the apparatus of FIG. 9, the lower portion of the housing 214 constitutes an outer sleeve which surrounds the sleeve 247 to define therewith an annular compartment 248 which communicates with the discharge end of the annular chamber 229 and with the intake end of the annular extrusion orifice 219. In other words, a portion of the compartment 248 constitutes a section of the path in which an annular stream of plasticized material flows from the chamber 229 into the orifice 219. The upper portion of the compartment 248 serves as a magazine or storage room, and this magazine terminates at the lower end portion 249 of the jacket 247. An annular plunger 250 which is reciprocable in the compartment 248 serves to expel seriatim equal quantities of plasticized material into the orifice 219, and this plunger is operatively connected with a second plunger 252 by means of several axially extending bolts 251, only one such bolt being actually shown in FIG. 9. The plunger 252 is reciprocable in the chamber of a cylinder 253 constituted by the upper portion of the housing 214. The right-hand part of FIG. 9 shows the plungers 250, 252 in their upper end positions 250a, 252a. The lower end positions of these plungers are shown in the left-hand part of FIG. 9. The plunger 252 is slidably telescoped onto a boss 254 which forms part of the adjusting rod 217. The manner in which the plunger 252 is controlled to move up and down is preferably the same as disclosed in connection with FIGS. 1 and 2.

The stream of plasticized material which issues from the plasticizer 211 enters the inlet 234 and flows into a pair of mirror symmetrical channels 132 which correspond to the channels 132, 133 of FIG. 7. These channels are separated from each other by a separator blade 237 which is located opposite the inlet 234. The secondary streams then flow through a pair of mirror symmetrical deflection zones 235 and enter two mirror symmetrical recesses 230. The sleeve 247, which can be considered as forming part of the housing 214, surrounds the channels 232 and recesses 230, and these recesses 230 again diverge or expand in the circumferential direction of the mandrel 215 so that each thereof extends along an arc of 180 degrees in a zone which is adjacent to the intake end of the chamber 229. The material of the two secondary streams is united in the chamber 229 and forms a single annular stream which flows through the chamber 229 and, on reaching the lower end portion 249 of the sleeve 247, enters the compartment 248 and progressively fills this compartment by simultaneously pushing the plunger 250 upwardly, i.e., toward the upper end position 250a. This plunger 250 is displaced in response to pressure which builds up in the compartment 248 because the upper chamber of the cylinder 253 is not under pressure and because the extrusion orifice 219 offers a considerable resistance to the flow of material therethrough. Also, the discharge end of the orifice 219 may be closed by a blow mold. In other words, the parison will not issue from the orifice 219 before the compartment 248 is filled or before the compartment 248 accommodates a predetermined quantity of plasticized material. When the plunger 252 reaches the upper end position 252a, it causes a control unit to admit compressed fluid into the upper chamber of the cylinder 253 (in the same way as described in connection with FIGS. 1 and 2) so that the plungers 250, 252 perform a working stroke and expel or eject the material through the orifice 219 whereby the expelled material forms a tubular parison of predetermined length.

It is preferred to construct the ejector including the plungers 250, 252 and the bolts 251 in such a way that the plunger 250 is not positively connected with the bolts. In other words, the plunger 250 actually floats in the compartment 248 and is compelled to move downwardly when the bolts 251 are moved by the plunger 252 so that their lower end faces bear against the upper end face of the plunger 250. This is of advantage because the plunger 250 then moves upwardly only when the compartment 248 receives a fresh supply of plasticized material. In other words, and assuming that the plunger 252 and the bolts 251 move upwardly at a time when the compartment 248 does not receive plasticized material, the lower plunger 250 need not share such upward movement of the bolts. This insures that pressure prevailing in the compartment 248 at least equals atmospheric pressure.

The apparatus of FIG. 9 exhibits all such advantages which are characteristic of the apparatus shown in FIGS. 1 and 2. The plunger 250 may expel or eject requisite quantities of plasticized material much faster than if such expulsion were to take place solely in response to pressure generated by the screw 211. The screw 211 can operate continuously but the plunger 250 will perform a working stroke at intervals which depend on the rate at which the material flows into the compartment 248.

The lower part of the mandrel 215 comprises a conical portion 215a which diverges toward the intake end of the extrusion orifice 219. This conical portion is surrounded by a complementary conical portion 250b at the lower end of the plunger 250 when the latter assumes its lower end position shown in the left-hand part of FIG. 9. Such configuration of the portions 215a, 250b insures that all of the material leaves the compartment 248 when the plunger 250 is caused to perform a working stroke. The inlet 234 extends through the outer sleeve of the housing 214 and through the inner sleeve 247.

Figure 10:
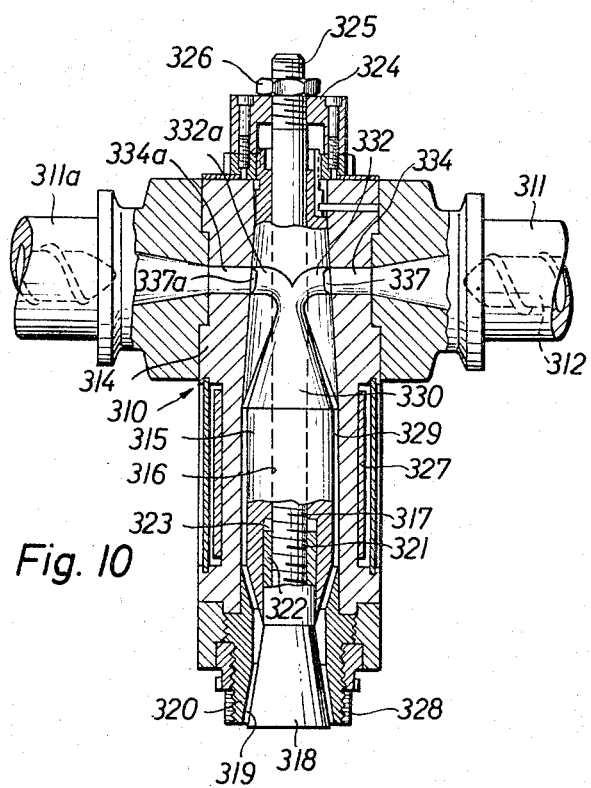
FIG. 10 is a similar view of a portion of a fourth apparatus.

Referring finally to FIG. 10, there is shown a further apparatus which is similar to the apparatus of FIGS. 5 to 8 with the important exception that it receives material from two plasticizers 311, 311a. The screws 312, 312a are disposed diametrically opposite each other and respectively feed streams of plasticized material into inlets 334, 334a provided in the housing 314 of the crosshead 310. The inlet 334 discharges into a pair of channels 332 which correspond to the channels 132, 133 of FIG. 7 or to the channels 232 of FIG. 9. The inlet 334a discharges into channels 332a which are mirror symmetrical replicas of the channels 332. Each of the two recesses 330 communicates with one of the channels 332 and with one of the channels 332a. The remaining parts shown in FIG. 10 are analogous to those described in connection with FIG. 5 and are identified by similar numerals with the exception that the first digit (1) is changed to "3".

It is clear that the apparatus of FIG. 10 or the apparatus of FIG. 5 may be modified to have a compartment similar to the compartment 248 shown in FIG. 9.

I claim:
1. An apparatus for producing tubular bodies of synthetic plastic material, comprising plasticizer means having an outlet for discharging a first stream of plasticized material; a tubular housing member having a lateral inlet for receiving material from said outlet; a mandrel member received in and defining with said housing member an annular chamber spaced from said inlet and a pair of mirror symmetrical recesses each communicating with said inlet and each diverging circumferentially of said mandrel member in a direction toward said chamber so that the material entering said recesses forms two secondary streams which expand laterally and merge in said chamber to form a single annular stream, said recesses being mirror symmetrical with reference to a plane which includes the axis of said mandrel member and halves said inlet; an extrusion die connected with said members and defining an annular extrusion orifice in communication with said chamber so that the material of the annular stream issuing from said orifice forms tubular parisons, said housing member comprising a first sleeve which surrounds said chamber and a second sleeve spacedly surrounding said first sleeve and defining therewith an annular compartment which communicates with the discharge end of said chamber and with the intake end of said orifice so that the material issuing from said chamber enters said orifice via said compartment; and ejector means for intermittently expelling plasticized material from said compartment into and through said orifice.

2. An apparatus for producing large tubular bodies of synthetic plastic material, comprising a plurality of plasticizer means each having an outlet for discharging a first stream of the same type of plasticized material; a tubular housing member having a plurality of lateral inlets each arranged to receive material from one of said outlets; a mandrel member received in and defining with said housing member an annular chamber spaced from said inlets and a pair of mirror symmetrical recesses each communicating with said inlets and each diverging circumferentially of said mandrel member in a direction toward said chamber so that the material entering said recesses forms two secondary streams which expand laterally and merge in said chamber to form a single annular stream, said recesses being mirror symmetrical with reference to a plane which includes the axis of said mandrel member and said members further defining between themselves one pair of channels for each of said inlets, each pair of channels connecting the respective inlet with said recesses so that each recess receives material from each inlet, each of said channels having a deflection zone wherein the material is deflected from a first direction which is substantially normal to said axis into a second direction which is substantially parallel with said axis; and an extrusion die connected with said members and defining an annular extrusion orifice in communication with said chamber so that the material of the annular stream issuing from said orifice forms tubular parisons.

3. An apparatus as set forth in claim 1, wherein said first named sleeve comprises an end portion adjacent to the discharge end of said chamber and wherein said ejector means comprises an annular plunger reciprocably received in said compartment, said plunger being movable to and from an end position in which it surrounds the end portion of the first named sleeve.

4. An apparatus as set forth in claim 1, wherein said mandrel member comprises an enlarged portion which diverges conically in a direction away from said chamber and wherein said ejector means comprises an annular plunger which is reciprocable in said compartment between two end positions, said plunger being movable toward and away from said orifice and having a conical portion which is complementary to and receives said enlarged portion in one of said end positions.

5. An apparatus as set forth in claim 1, further comprising control means for automatically operating said ejector means in response to accumulation of a predetermined quantity of plasticized material in said compartment.

References Cited
UNITED STATES PATENTS

| | | | |
|---|---|---|---|
| 2,560,778 | 7/1951 | Richardson et al. | 18—13 |
| 2,750,625 | 6/1956 | Colombo | 18—14 |
| 3,090,994 | 5/1963 | Stenger | 18—14 X |
| 3,205,534 | 9/1965 | Langecker | 18—141 |
| 3,239,881 | 3/1966 | Larsen | 18—14 X |

J. SPENCER OVERHOLSER, *Primary Examiner.*

W. L. McBAY, *Assistant Examiner.*